United States Patent Office 3,468,873
Patented Sept. 23, 1969

3,468,873
WATER-SOLUBLE THIAZOLYL MONOAZO-DYESTUFFS
Fritz Meininger, Frankfurt am Main, and Ludwig Schläfer, Sulzbach, Taunus, Germany, assignors to Farbwerke Hoechst Aktiengesellschaft vormals Meister Lucius & Bruning, Frankfurt am Main, Germany, a corporation of Germany
No Drawing. Filed Apr. 14, 1967, Ser. No. 630,795
Claims priority, application Germany, Apr. 20, 1966,
F 48,969
Int. Cl. C09b 49/06, 29/36
U.S. Cl. 260—158         6 Claims

ABSTRACT OF THE DISCLOSURE

Water-soluble monoazo-dyestuffs and a process for their preparation and especially to dyestuffs of the general Formula 1:

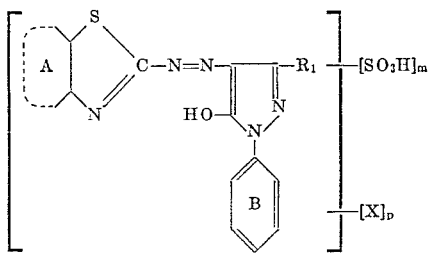
(1)

wherein A represents a radical of the benzene and naphthalene series, X represents a grouping linked to A and/or B of the formula

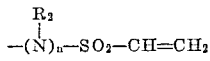
(2)

or

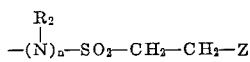
(3)

Wherein $R_2$ represents a hydrogen atom or an alkyl radical containing from 1 to 4 carbon atoms and Z represents an inorganic or organic radical which may be split off by an alkaline agent, $R_1$ represents a alkyl, carboxy or carbalkoxy group, $m$ represents an integer from 0 to 3, $n$ represents the number 0 or 1 and $p$ represents the number 1 or 2, suitable for the dyeing of textile materials especially of those of wool, silk, natural or regenerated cellulose or polyamide fibers.

---

The present invention relates to new valuable water-soluble monoazo-dyestuffs and to a process for their preparation; it relates especially to dyestuffs of the general Formula 1

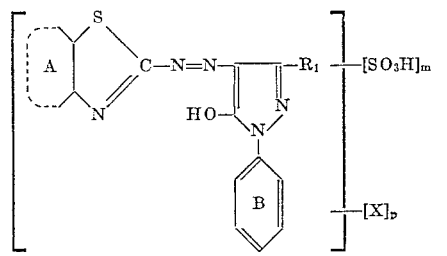
(1)

wherein A represents a radical of the benzene or naphthalene series, X represents a grouping linked to A and/or B of the formula

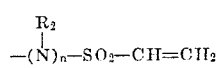
(2)

or $$-(\overset{R_2}{\underset{|}{N}})_n-SO_2-CH_2-CH_2-Z \qquad (3)$$

wherein $R_2$ represents a hydrogen atom or an alkyl radical containing from 1 to 4 carbon atoms and Z represents an inorganic or organic radical which may be split off by an alkaline agent, $R_1$ represents an alkyl, carboxy or carbalkoxy group, $m$ represents an integer from 0 to 3, $n$ represents the number 0 or 1 and $p$ represents the number 1 or 2.

These dyestuffs can be prepared by diazotizing 1 mole of an amine of the general Formula 4

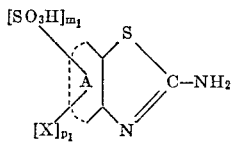
(4)

wherein A represents a radical of the benzene or naphthalene series, X represents a grouping of Formulae 2 and 3 mentioned above or a grouping of Formula 5.

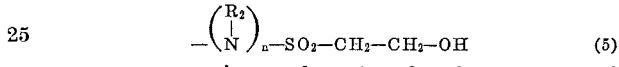
(5)

$m_1$ represents an integer from 0 to 3 and $p_1$ represents 0 or 1, and coupling it with 1 mole of an azo component of the general Formula 6

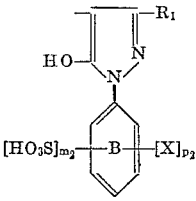

(6)

wherein $R_1$ has the above-mentioned meaning and X represents a grouping of formulae 2, 3 and 5 mentioned above $m_2$ and $p_2$ represent 0 or 1 and the benzene nucleus B may contain further substituents, and the diazo and azo components are to be chosen in such a way that the sum of $m_1$ and $m_2$ is 0 to 3 and the sum of $p_1$ and $p_2$ is 1 or 2; in the case that one of the components contains grouping is converted into the corresponding sulfuric acid a grouping of the above-mentioned Formula 5, this ester group.

Radicals Z, which may be split off by an alkaline agent are, for example: halogen atoms, such for example as chlorine or bromine atoms, an alkyl-sulfonic acid ester group with an alkyl group containing, for example, from 1 to 4 carbon atoms, or an aryl-sulfonic acid ester group such for example as an ester group of the benzene- or naphthaline-sulfonic acid, or an acyloxy group, such for example as the acetoxy group, furthermore a phenoxy or a dialkyl-amino group, such for example as the dimethyl or diethyl-amino group, the thiosulfuric acid ester group and especially the sulfuric acid ester group.

In addition to one of the aforementioned groupings of Formula 2 or 3 and the sulfonic acid group the aromatic nuclei A and B may contain substituents usual in azo-dyestuffs, such for example as lower alkyl, lower alkoxy, carboxyl, nitro, sulfamido, carb-lower-alkoxy, N,N-di-lower alkyl sulfamido, chlorine, bromine or acetylamido.

The conversion of the groups of Formula 5 into the corresponding sulfuric acid ester groups may be effected in different ways, for example by treating them with concentrated sulfuric acid, monohydrate or sulfuric acid or chlorosulfonic acid or with amidosulfonic acid in the presence of a tertiary organic hydroxide solution, such as pyridine or a picoline.

The monoazo-dyestuffs with a grouping of Formula 3 described above may also be prepared by modifying the process, i.e. by converting subsequently the grouping of Formula 2 contained in the monoazo-dyestuff obtained according to the process of the present invention into the grouping of Formula 3. A grouping of Formula 2 contained in the monoazo-dyestuffs, obtained according to the process of the present invention may, for example, be converted into a β-thiosulfato-ethyl-sulfonic group by means of salts of the thiosulfuric acid or into a β-dialkyl-aminoethylsulfonic group by the action of a dialkyl amine.

In addition to this, the monoazo-dyestuffs with a grouping of Formula 2 may also be prepared when modifying the process, by converting subsequently the grouping of Formula 3 contained in the monoazo-dyestuff obtained according to the process of the present invention by means of alkaline agents, such for example as an aqueous sodium hydroxide solution, into the grouping of Formula 2.

The 2-aminothiazole or 2-amino-naphthiazole derivatives, used as diazo components, are obtained from the correspondingly substituted anilines or naphthyl amines by reacting them with alkyli thiocyanates in the presence of an oxidizing agent.

Thus, for example, the 2-amino-benzthiazole-6-sulfonic acid is obtained in stoichiometric quantities at a very good yield, by reacting sulfanilic acid in an aqueous mineral acid suspension with alkali thiocyanate in the presence of iron (III) or copper (II) salts. The diazotization is preferably effected in sulfuric acid with nitrosylsulfuric acid as diazotizing agent.

The monoazo-dyestuffs obtained according to the present invention show a high tinctorial strength and are valuable dyestuffs for the dyeing of wool, silk and polyamide fibers. They are dyed in an acid, neutral or weakly alkaline bath. They are also especially valuable as "reactive dyestuffs" for dyeing and printing cotton and other natural or regenerated cellulose fibers. When dyeing such fiber materials the dyestuffs are used according to printing or dyeing processes in connection with a treatment of acid-binding agents, such as sodium hydroxide, sodium carbonate or sodium bicarbonate.

Processes of this kind are shown from the more recent literature (cf. "Melliand Textilberichte" 1959, 539 and 1965, 286). According to these processes especially cellulose textile materials can be dyed in deep golden yellow to red orange shades, which show a far better fastness to wet processing than dyeings of comparable shades with direct dyestuffs. When dyeing cellulose materials the new dyestuffs prove a good affinity. When printed on cotton the dyestuffs show extraordinarily sharp contours of the print, especially by carrying out the modern economical processes, for example with the rapid thermosetting process as well as with the two-phase printing (cf. "Melliand Textilberichte" 1962, 265 as well as "Textilpraxis" 1965, 594).

The following examples serve to illustrate the invention but they are not intended to limit it thereto; the parts being by weight unless stated otherwise.

EXAMPLE 1

7.35 parts of 2-amino-6-(N-methyl-N-ethionyl)-amino-benzthiazole were dissolved in 100 parts of semiconcentrated sulfuric acid at a temperature of 40° C. The solution obtained was cooled and, after addition of 6.05 parts of nitrosylsulfuric acid of 42% strength at −10° to 0° C., stirred for 2 hours at 0° C. After having destroyed the nitrosylsulfuric acid in excess by means of amidosulfonic acid a neutral solution of 5.16 parts of 1-(4′-sulfophenyl)-3-methyl-5-pyrazolone in 25 parts by volume of water was added and the pH was adjusted to 6 by 630 parts by volume of a sodium carbonate solution of 10% strength. When the coupling was terminated the batch was salted out with 15% of potassium chloride (referred to the volume of the solution), filtered off and washed with a potassium chloride solution of 15% strength. The dyestuff, which corresponds in the form of free acid to the formula

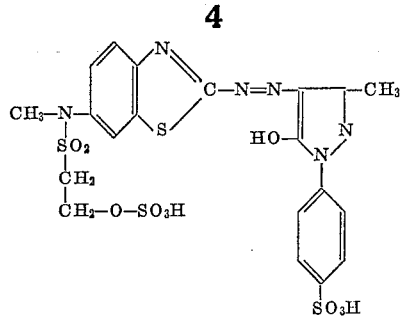

was dried in vacuo at 60° C.

An orange powder was obtained which is easily soluble in water with the same color and which yields on cellulose fibers in the presence of an alkaline agent strong, golden yellow prints and dyeings of good fastness to wet processing.

When printed according to the two-phase process excellent sharp contours were obtained.

EXAMPLE 2

28.7 parts of 2-amino-6-(N-methyl-N-β-oxethylsulfonyl)-amino-benzthiazole were dissolved in 200 parts of semi-concentrated sulfuric acid at room temperature. At a temperature in the range of from 0° to 5° C., 36 parts of nitrosylsulfuric acid of 40% strength were added and stirred for 2 hours. After having destroyed the nitrosylsulfuric acid in excess a neutral solution of 28.6 parts of 1-(4′-sulfophenyl)-3-methyl-5-pyrazolone in 125 parts by volume of water was added. By addition of 1,500 parts by volume of a sodium carbonate solution of 10% strength the pH was adjusted to 4 to 5. After stirring for several hours the dyestuff precipitated. It was filtered off, washed with a sodium sulfate solution of 20% strength and dried. The whole dry product was introduced into 150 parts of sulfuric acid monohydrate at a temperature of 10 to 15° C. and stirred for 15 hours at room temperature (20 to 25° C.). The viscous mixture was then decomposed on 1,000 parts of finely crushed ice and adjusted to a pH value of 6 by means of 160 parts of anhydrous sodium carbonate. The dyestuff was separated with 15% of potassium chloride (referred to the volume of the solution), filtered off and washed with 100 parts of a potassium chloride solution of 15% strength.

The dyestuff is identical to that described in Example 1.

EXAMPLE 3

7.95 parts of 2-amino-5-methoxy-6-(N-methyl-N-ethionyl)-amino-benzthiazole were dissolved in 100 parts of semi-concentrated sulfuric acid at 40° C. and diazotized within 2 hours at 0° to 5° C. with 6.05 parts of nitrosylsulfuric acid of 42% strength. After addition of amidosulfonic acid in order to destroy the nitrosylsulfuric acid in excess, a neutral solution of 5.2 parts of 1-(4′-sulfophenyl)-5-pyrazolone-3-carboxylic acid in 25 parts of water was added and adjusted to pH 6 with 620 parts by volume of a sodium carbonate solution of 10% strength. The dyestuff which could not be salted out was obtained by evaporating the solution in vacuo at 60° C. or by spray-drying. It corresponds in the form of free acid to the formula

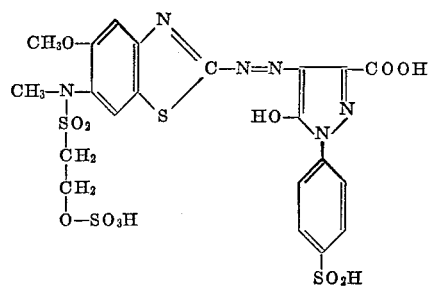

The red-brown dyestuff powder is easily soluble in water and yields on cellulose fibers strong orange dyeings, fast to wet processing.

EXAMPLE 4

230 parts of 2-amino - 6-sulfo-benzthiazole were dissolved in 400 parts by volume of concentrated sulfuric acid. 360 parts of nitrosylsulfuric acid were added at 0° C. and the whole was then stirred for 30 minutes at a temperature within the range of from 0 to 5° C. In the course of 90 minutes and at the same temperature 1,600 parts of finely crushed ice were added and the remainder of nitrosylsulfuric acid was destroyed by amidosulfonic acid. An ice-cold solution of 354 parts of 1-(4'-β-hydroxy-ethylsulfonyl)-phenyl - 3-methyl - 5-pyrazolone of 80% strength in 1,400 parts of water was then added to the resulting suspension of the diazonium salt; it was neutrally dissolved by the addition of 650 parts by volume of a 2-N-sodium hydroxide solution. In the course of 2½ hours the reaction mixture was then mixed with 1,200 parts of anhydrous sodium carbonate and, by addition of 8,000 parts of ice water, kept in a state which allows the stirring of the suspension. After having stirred the dyestuff suspension for 10 hours it was heated up to 80° C.

The suspension was then slowly cooled off, filtered and dried in vacuo at 60° C. Within 3 hours the precipitated dyestuff was added to 900 parts by volume of concentrated sulfuric acid and stirred for 20 hours at room temperature.

The viscous reaction mixture was then added to 13,000 parts of ice/water while stirring and neutralized with 1,860 parts of anhydrous sodium carbonate. The dyestuff, which corresponds in the form of free acid to the formula

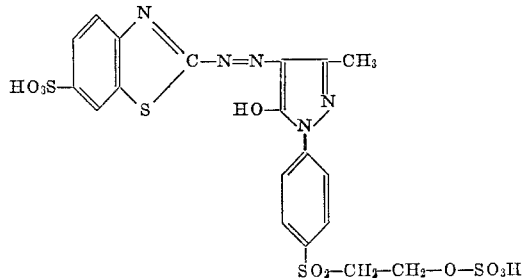

precipitated without further addition of salt. Together with orange-red color, the dyestuff is soluble in water and yields on cotton, according to the two-phase and rapid thermosetting process, golden yellow prints of good fastness to wet processing and sharp contours.

EXAMPLE 5

70.8 parts of 1-(4'-β-hydroxy-ethylsulfonyl)-phenyl-3-methyl-5-pyrazolone of 80% strength were added at 15° to 20° C. to 100 parts of concentrated sulfuric acid and stirred for 15 hours at room temperature. The whole was then added to 2,000 parts of ice/water while stirring and neutralized by 106 parts of sodium carbonate. By the addition of 30 parts by volume of concentrated sodium hydroxide solution, the pH was adjusted to 10 and the solution was stirred for 30 minutes until cold. The coupling solution thus obtained was given into a suspension of 46 parts of 2-amino-6-sulfo-benzthiazole which has been diazotized according to Example 4. The dyestuff precipitated without further addition of salt. In the form of free acid it corresponds to the formula

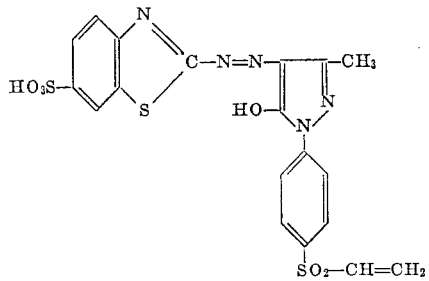

The same dyestuff can be obtained by separating by the action of alkali hydroxide at room temperature 1 mole of sulfuric acid from the dyestuff described in Example 4.

EXAMPLE 6

50.5 parts of the dyestuff corresponding to the formula

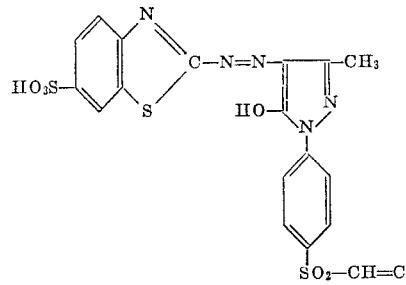

(prepared according to Example 5) were dissolved in 1,500 parts by volume of water at a temperature of 60° C. and, at a pH value of 5 to 6, mixed with 37.2 parts of crystallized sodium thiosulfate and stirred for 6 hours at 60° to 65° C. By dropwise addition of further diluted acetic acid the pH value was maintained. The dyestuff solution was then filtered while hot and dried in vacuo by spraying. An orange powder was obtained which is easily soluble in water. In the form of free acid the obtained dyestuff corresponds to the formula

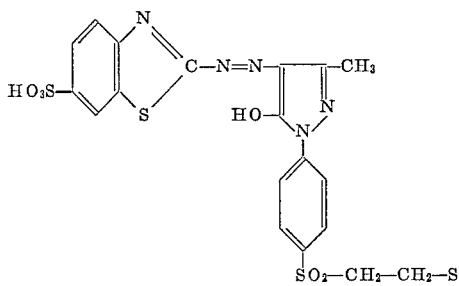

In the presence of a sodium hydroxide solution the dyestuff yields on cellulose fiber material golden yellow dyeings and prints of good fastness to wet processing.

EXAMPLE 7

At a temperature of 45° C., 23 parts of 2-aminobenzthiazole-6-sulfonic acid were dissolved in 40 parts by volume of concentrated sulfuric acid, cooled at 0 to 5° C. and diazotized with 36 parts of nitrosylulfuric acid of 40% strength. After 30 minutes 200 parts of ice were carefully added at 10° C. and the nitrosylfuric acid in excess was then destroyed.

As azo component, 39.2 parts of the sulfuric acid ester of 1-(4'-β-hydroxyethylsulfonyl)-phenyl - 5-pyrazolone-3-carboxylic acid were added in form of a neutralized aqueous solution (1,500 parts by volume). By the addition of 120 parts of sodium carbonate the pH was adjusted to 7. When the coupling was terminated the dyestuff solution has been mixed with 15 parts of an aqueous diethylamine solution of 38% strength. In the course of 15 minutes, 125 parts by volume of a 2N sodium hydroxide solution were then added and stirred for 1 hour at 50° C. and at a pH of 11. After cooling to room temperature, the pH was adjusted to 6 by means of dilute hydrochloric acid and the dyestuff was salted out with 10% of potassium chloride (referred to the reaction volume).

With orange-red color the dyestuff, which corresponds as free acid to the formula

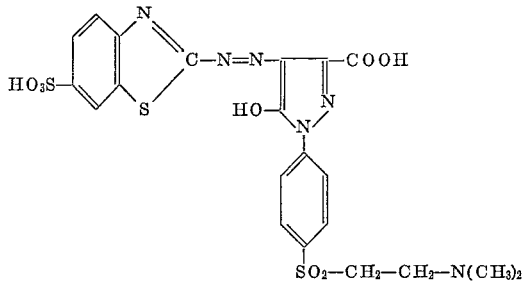

is easily soluble in water and forms a printing paste which is very resistant to alkalies. On cotton, it yields orange-red dyeings of good fastness to wet processing.

EXAMPLE 8

At a tempertaure of 30 to 40° C., 36 parts of 2-aminonaphtho [2,1] thiazole-4,8-disulfo acid were added to 100 parts by volume of concentrated sulfuric acid. After cooling off to 0 to 5° C., 36 parts of aqueous nitrosylsulfuric acid of 40% strength were added and stirred for 1 hour. At a temperature, which shall not exceed 10° C., 200 parts of finely crushed ice were added and the nitrosylsulfuric acid in excess was destroyed by amidosulfonic acid. As azo component, an acid solution of the sulfuric acid ester of 1(4'-β-hydroxyethyl-sulfonyl)-phenyl - 3-methyl - 5-pyrazolone (obtainable by the reaction of 31.7 parts of (1-(4'-β-hydroxyethylsulfonyl)-phenyl - 3-methyl - 5-pyrazolone with 140 parts of concentrated sulfuric acid and decomposition of 1,200 parts of ice) was added and neutralized with 410 parts of anhydrous sodium carbonate. In order to maintain the possibility of stirring the coupling mixture at a temperature of about 10° C. a further 2,000 parts of ice were added during the process of neutralization. The obtained dyestuff was then salted out with 15% of potassium chloride (referred to the reaction volume). As free acid it corresponds to the formula

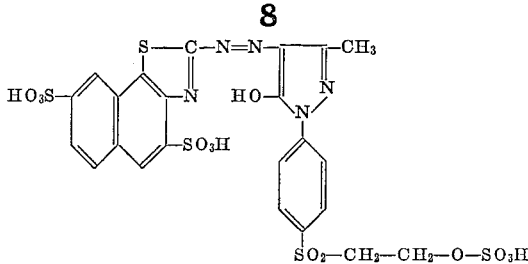

and presents a scarlet powder.

In the presence of sodium carbonate, it yields on cotton full red-orange dyeings of good fastness to wet processing.

The dyestuffs, specified in the following table, may be prepared in a manner analogous to the examples given above. On cellulose fibers they also yield dyeings and prints of the already stated good fastness properties.

| | Diazo component | Azo component | Tint |
|---|---|---|---|
| 1 | 2-amino-6-(N-methyl-N-ethionyl)-amino benzthiazole | 1-(4'-sulfo-phenyl)-5-pyrazolone-3-carboxylic acid | Orange. |
| 2 | Amino-6-N-ethionyl-aminobenzthiazole | do | Do. |
| 3 | 2-amino-6-(N-methyl-N-ethionyl)-amino-benzthiazole | 1-(2'-chloro-5'-sulfo-phenyl)-3-methyl-5-pyrazolone | Golden yellow. |
| 4 | do | 1-(2'-methyl-4'-sulfo-phenyl)-methyl-5-pyrazolone | Reddish yellow. |
| 5 | do | 1-(2',5'-dichloro-4'-sulfo-phenyl)-3-methyl-5-pyrazolone | Golden yellow. |
| 6 | do | 1-(3'-nitrophenyl)-5-pyrazolone-3-carboxylic acid | Orange. |
| 7 | do | 1-(2'-methyl-4'-sulfo-phenyl)-5-pyrazolone-3-carboxylic acid. | Reddish yellow. |
| 8 | 2-amino-6-(β-hydroxy-ethylsulfonyl-sulfuric acid ester)-benzthiazole. | 1-(4'-sulfo-phenyl)-5-pyrazolone-3-carboxylic acid | Do. |
| 9 | do | 1-(4'-sulfo-phenyl)-3-methyl-5-pyrazolone | Golden yellow. |
| 10 | 2-amino-6-vinylsulfonyl-benzthiazole | do | Do. |
| 11 | 2-amino-6-ethoxy-benzthiazole | 1-(4'-β-hydroxyethylsulfonyl-phenyl-sulfuric acid ester)-3-methyl-5-pyrazolone. | Orange. |
| 12 | 2-amino-6-carboxy-benzthiazole | do | Reddish yellow. |
| 13 | 2-amino-4-methyl-benzthiazole-6-sulfonic acid | do | Golden yellow. |
| 14 | 2-amino-6-methyl-benzthiazole-4-sulfonic acid | do | Do. |
| 15 | 2-amino-6-β-hydroxyethylsulfonyl-sulfuric acid ester-benzthiazole. | 1-(4'-β-hydroxy-ethylsulfonyl-sulfuric acid ester-phenyl)-3-methyl-5-pyrazolone. | Do. |
| 16 | 2-amino-6-(N-methyl-N-ethionyl)-amino-benzthiazole | do | Do. |
| 17 | 2-amino-benzthiazole-6-sulfonic acid | 1-(4'-β-hydroxyethylsulfonyl-sulfuric acid ester-phenyl)-3-carboxy-5-pyrazolone. | Reddish yellow. |
| 18 | do | 1-(4'-β-hydroxyethylsulfonyl-sulfuric acid ester-phenyl)-3-carbethoxy-5-pyrazolone. | Golden yellow. |
| 19 | 2-amino-naphtho(1,2)-thiazole-5-sulfonic acid | 1-(4'-β-hydroxyethylsulfonyl-sulfuric acid ester-phenyl)-3-methyl-5-pyrazolone. | Orange. |
| 20 | 2-amino-naphtho(2,1)-thiazole-6-sulfonic acid | do | Do. |
| 21 | 2-amino-naphtho(2,1)thiazole-7-sulfonic acid | do | Do. |
| 22 | 2-amino-naphtho(2,1)thiazole-4,7-disulfonic acid | do | Do. |
| 23 | 2-amino-naphtho(2,1)-thiazole-5,9-disulfonic acid | do | Do. |
| 24 | 2-amino-naphtho(2,1)thiazole-6,8-disulfonic acid | do | Do. |
| 25 | 2-amino-naphtho(2,1)thiazole-7,9-disulfonic acid | do | Do. |
| 26 | 2-amino-naphtho(2,1)thiazole-4,7,9-trisulfonic acid | do | Do. |
| 27 | 2-amino-naphtho(2,1)thiazole-7,9-di-sulfonic acid | 1-(4'-β-hydroxy-ethylsulfonyl-sulfuric acid ester-phenyl)-3-carboxy-pyrazolone. | Scarlet. |

We claim:
1. The water-soluble monoazo-dyestuff of the formula

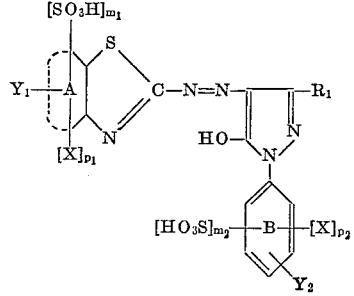

wherein A represents the benzene or naphthalene radical, X represents one of the groupings

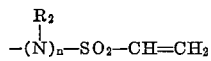

and

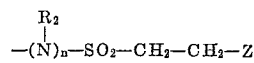

in which $R_2$ represents hydrogen or lower alkyl, $n$ the integer 0 or 1, and Z represents sulfato, thiosulfato or di-lower alkylamino, $Y_1$ and $Y_2$ represent hydrogen, lower alkyl, lower alkoxy, carboxyl, nitro, sulfamido, carb-lower-alkoxy, N,N-di-lower alkyl sulfamido, chlorine, bromine or acetylamido, $R_1$ represents lower alkyl, carboxy or carb-lower-alkoxy, $m_1$ stands for an integer from 0 to 3, $m_2$ for the integer 0 or 1, the sum of $m_1$ and $m_2$ being at most 3, $p_1$ and $p_2$ stand for the integers 0 or 1, the sum of $p_1$ and $p_2$ being at least 1.

2. A dyestuff as claimed in claim 1, having the formula

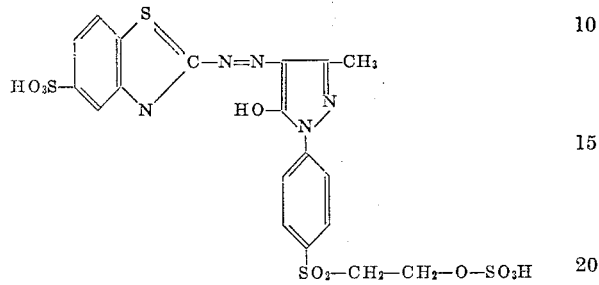

3. A dyestuff as claimed in claim 1 having the formula

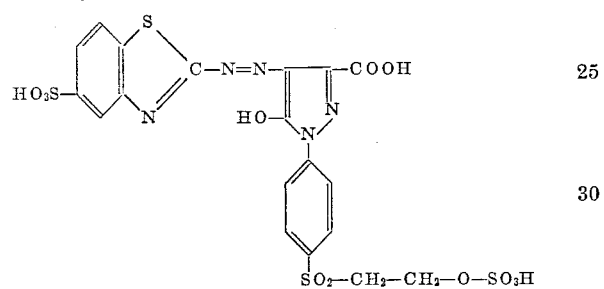

4. A dyestuff as claimed in claim 1, having the formula

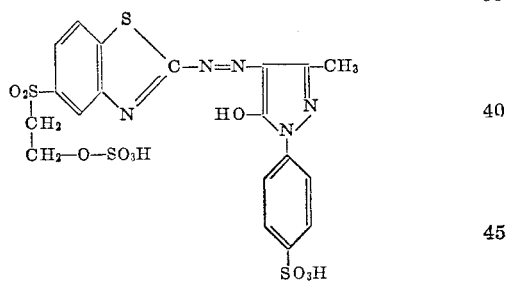

5. A dyestuff as claimed in claim 1 having the formula

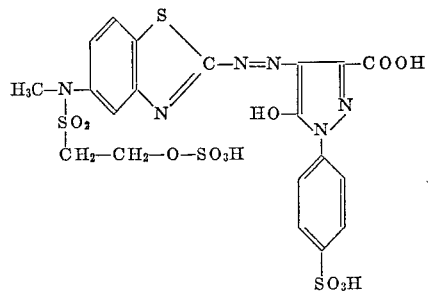

6. A dyestuff as claimed in claim 1 having the formula

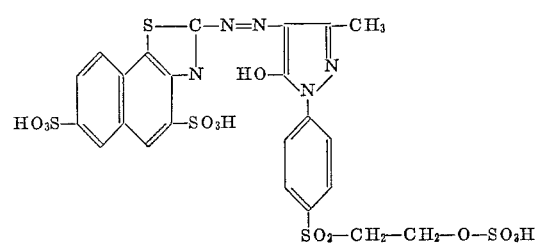

References Cited

UNITED STATES PATENTS 3,152,114 10/1964 Siegel et al. _____ 260—157

CHARLES B. PARKER, Primary Examiner

D. M. PAPUGA, Assistant Examiner

U.S. Cl. X.R.

8—41, 51, 54, 55; 260—37, 305,310